Oct. 21, 1941.   H. J. MIDDLETON ET AL   2,260,043
TOASTER
Filed Oct. 1, 1940      2 Sheets-Sheet 2
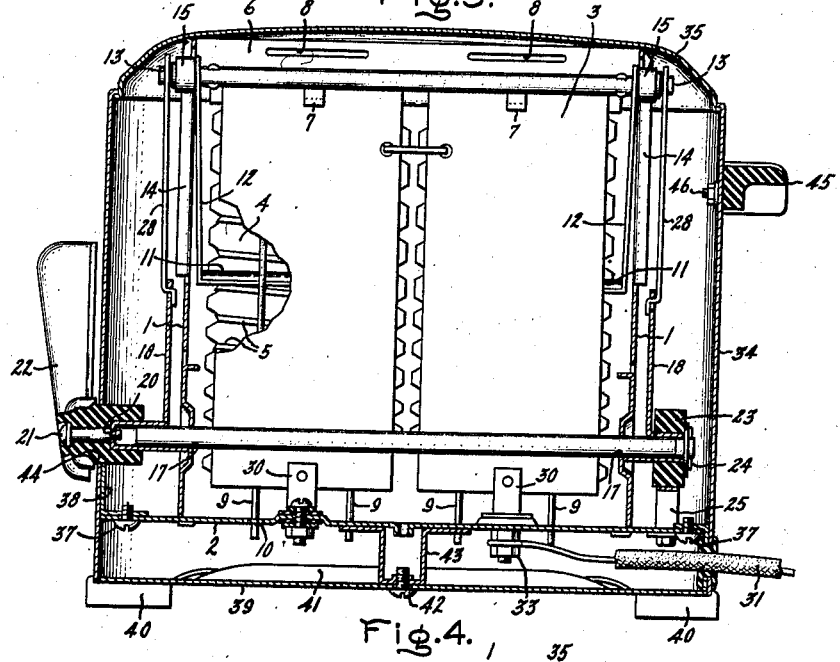
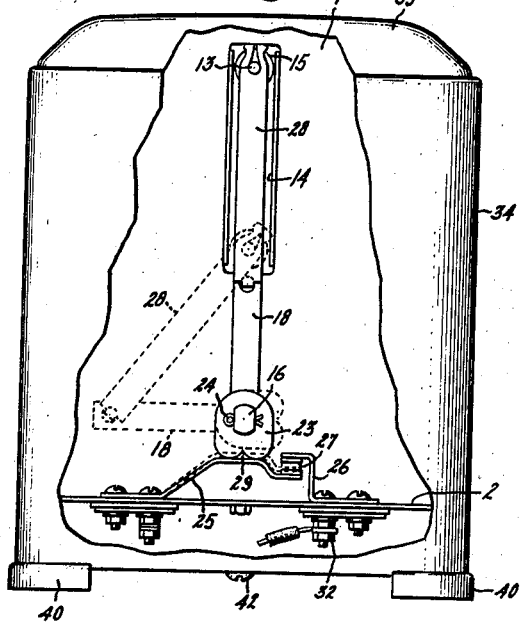
Inventors:
Hugh J. Middleton,
John A. Hashek,
by Harry E. Dunham
Their Attorney.

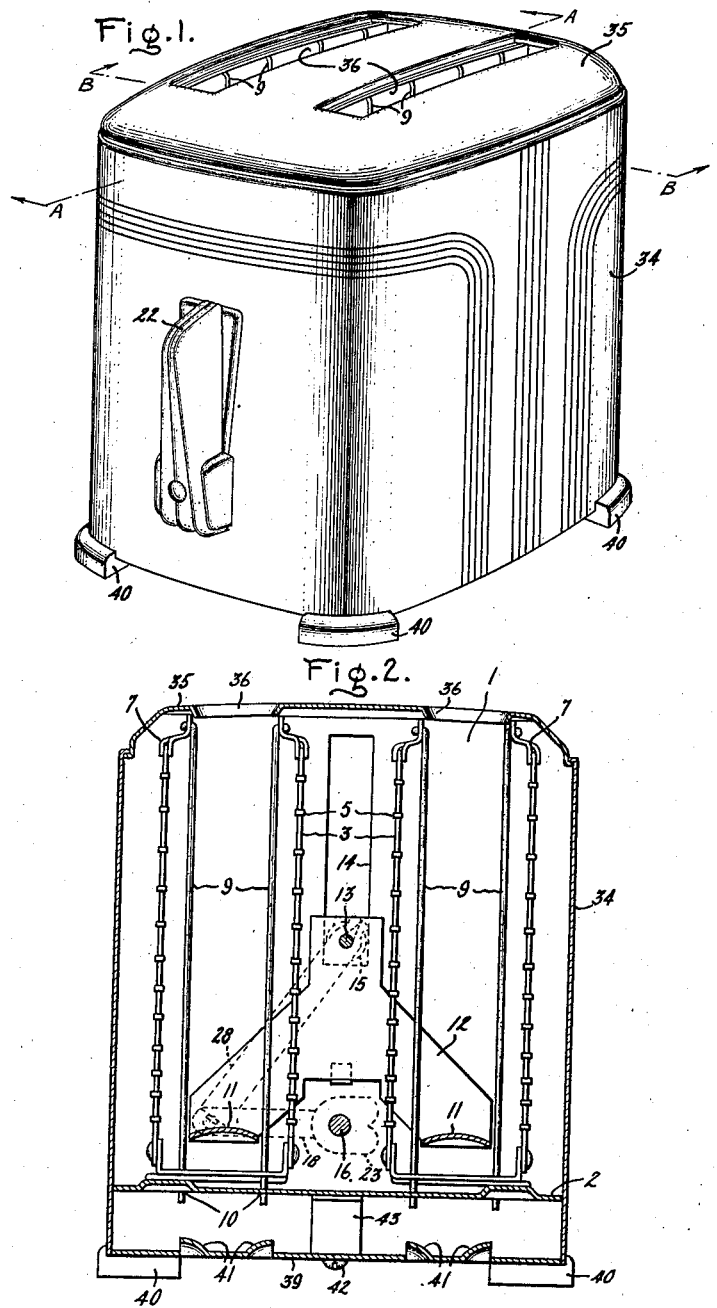

Patented Oct. 21, 1941

2,260,043

UNITED STATES PATENT OFFICE 2,260,043

TOASTER

Hugh J. Middleton and John A. Hashek, Toronto, Ontario, Canada, assignors to General Electric Company, a corporation of New York Application October 1, 1940, Serial No. 359,250 In Canada March 6, 1940

6 Claims. (Cl. 219—19)

Our invention relates to electric toasters and particularly to electric toasters designed for the toasting of one or more slices of bread supported between vertically mounted heating elements.

An object of our invention is to provide an improved toaster of this type having a novel switch actuating means linked to and controlled by movement of the bread slice support between the heating elements.

A further object of our invention is to provide a linkage mechanism actuated by a control lever, whereby the said bread slice support may be raised to an inoperative position or lowered to an operative position, and whereby the support will remain in either one of these positions until moved to the other position by manual actuation of the control lever.

Further objects and advantages of our invention will become apparent from the following specification and are pointed out with particularity in the appended claims.

In accordance with the embodiment of our invention described herewith, we provide a toaster having a toasting compartment for toasting a bread slice supported vertically therein.

The movement of the bread slice support tray is effected by a centrally located horizontal roller shaft moving on free-running rollers in slots provided in vertical end plates provided on the base of the toaster.

The operation of the roller shaft is controlled through a linkage system connected to a crankshaft. The crankshaft passes longitudinally through the center of the toaster near the base thereof and is provided at its one end with a control lever mounted in an easily accessible position outside the toaster casing. At the other end of the crankshaft, a cam-actuated switch is mounted for operations initiated by movement of the control lever. The cam-operated switch is so arranged that the electric supply circuit for the toaster is initiated when the bread slice support tray is lowered to its operative toasting position, and the circuit is broken when the bread slice support tray is raised to its inoperative position. The switch cam is designed in a novel manner whereby after the switch has been moved to either the open or the closed position by actuation of the control lever, the bread slice support is retained in position, (either inoperative or operative, as the case may be), until the position of the cam is changed by manual actuation of the control lever.

For a more complete understanding of our invention, reference should be had to the following description taken together with the accompanying drawings in which the same reference characters refer to the same parts through the several views.

In the drawings:

Fig. 1 is a perspective view of an electric toaster embodying our invention; Fig. 2 is a sectional view taken along the lines B—B of Fig. 1; Fig. 3 is a sectional view taken along the line A—A of Fig. 1 and having certain parts shown in section and other parts shown partly broken away to clarify the construction; and Fig. 4 is an elevation view of the toaster shown in Fig. 1, as viewed looking toward the end remote from the operating lever. Part of the outer casing is broken away to show the location and action of the cam-actuated switch mechanism and the linkage arrangement between the roller shaft and the crankshaft.

Referring to the drawings, and particularly to Figs. 2, 3 and 4 for constructional details, a pair of spaced apart end plates 1 are vertically mounted on an inner base plate 2. Heating elements 3, comprising mica sheets 4 wound on the one side thereof with resistance conductors 5, are located in pairs with their wound sides facing inwardly, whereby each pair forms a separate toasting compartment. Rigid horizontal supports 6 interconnect the tops of the end plates 1 and are provided with downwardly projecting tabs 7 for supporting and positioning the upper ends of the elements 3. The horizontal supports 6 are also provided with openings 8 to receive and support the upper ends of guard wires 9 vertically mounted between the elements 3 and projecting through openings 10 in the base plate 2.

Bread slice support trays 11 are mounted for free vertical movement between the guard wires 9 in each toasting compartment. Tray hangers 12, of a general inverted V-shape, connect together the adjacent ends of the support trays 11 as best seen in Fig. 2, the ends of the arms of each inverted V are connected to the ends of the trays 11 and the apex of each inverted V is connected to a roller shaft 13. The roller shaft 13 extends longitudinally through the center of the toaster in the space between the bread slice compartments and projects through vertical slots 14 in the end plates 1. The roller shaft 13 is provided with rollers 15, loosely mounted adjacent each end thereof and located for free movement in the vertical slots 14.

A crankshaft 16 is rotatably mounted in holes 17 in end plates 1 and extends longitudinally through the central section of the toaster, parallel to, but considerably below, the roller shaft 13. Each end of the shaft 13 projects beyond the end plate in which it is mounted.

Cranks 18 are rigidly mounted on each projecting end of the crankshaft 16. The crank mounted on the left end of the crankshaft 16, as viewed in Fig. 2, is provided with a threaded hole 20 to receive a holding screw 21 passing through and supporting an operating lever 22. A switch cam 23 is non-rotatably mounted on the hub of the crank 18 mounted on the right end of the crankshaft 16, as viewed in Fig. 2. The cam 23 is held in position by a cotter pin 24. The switch cam 23 cooperates with a movable switch blade 25 mounted on the base plate 2, whereby rotation of the cam 23 moves the switch blade 25 into, or out of, engagement with a fixed switch blade 26 also mounted on the base plate 2. Suitable contact points 27 are provided on switch blades 25 and 26 at the points where they come together when the circuit is closed. The movable switch blade 25 is normally spring-biased towards the fixed blade 26, but the operating lever 22 in the vertical position as illustrated in Figs. 1, 3 and 4 of the drawings, the switch cam 23 holds the movable switch blade 25 out of contact with the fixed switch blade 26.

Manual movement of the operating lever 22 through 90° in either direction from the central vertical position lowers the bread slice support trays 11 to operating position (as in Fig. 2) and rotates the switch cam 23, allowing the contacts 27 to close.

The movement of the operating lever 22 through 90° in either direction from the central vertical position rotates the crankshaft 16 through 90° and hence rotates the rigidly mounted cranks 18, at the ends of the crankshaft 16, through 90°. The free ends of the cranks 18 are linked directly to the projecting ends of the roller shaft 13 by pivotally-connected links 28, and hence the rotation of the cranks moves the roller shaft vertically downward. This downward movement of the roller shaft 13 is facilitated by the freely mounted rollers 15 moving in the end slots 14. Since the bread slice support trays 11 are linked together, and to the roller shaft 13, by the inverted V-shaped tray hangers 12, the lowering of the roller shaft 13 lowers the trays 11 to their operating position.

As best indicated in Fig. 4, the switch cam 23 is of a general oblong shape but flattened at the one end of its longitudinal axis as indicated at 29. When the operating lever 22 is in the central vertical position, the longitudinal axis of the cam 23 is also vertical and the flattened side 29 contacts the spring-biased movable switch blade 25 and holds it out of contact with the fixed switch blade 26. The pressure between the flattened side 29 of the cam 23 and the movable switch blade 25 is sufficient to prevent further movement of the operating parts until the lever is manually moved to another position. Thus, when the operating lever remains in the central vertical position, the bread support trays 11 are supported in the non-operative position and the contacts 27 are held apart.

As illustrated by the broken lines in Fig. 4, when the cam 23 is rotated through 90°, in either direction by manual movement of the operating lever 22, the short axis of the cam takes up the vertical position and the movable switch blade 25 is released, allowing the contacts 27 to close.

The electrical connections of the toaster embodying our invention are well known in the art and are not illustrated here in detail. The resistance wires 5 of the elements 3 in each bread slice compartment are connected together in multiple by jumpers 30 and the pairs thus formed are series-connected through the switch contacts 27 to a supply conductor 31. One lead of the supply conductor 31 is connected directly to a terminal screw 32 on the fixed switch arm 26 and the other lead connects to a terminal screw 33 on one of the element jumpers 30.

Suitable mica insulating washers and strips are provided in the manner well-known in the art to prevent grounding of any connections on the metal parts of the toaster.

An outer casing 34, which in this embodiment is formed from a single sheet of metal, encloses the operating parts of the toaster and a top cover 35, with bread slice receiving openings 36, interfits with the casing 34 to complete the housing.

Screws 37 cooperating with threaded brackets 38 mounted on the inside walls of the casing 34 are utilized to secure the casing to the inner base plate 2.

An outer base 39, provided with suitable heat insulating feet 40 and vents 41, is fastened by a single screw 42 to support bracket 43 centrally mounted on the bottom of the inner base plate 2.

The operating lever 22 passes through an opening 44 in the casing 34 and is fastened in position by the holding screw 21 which engages the threaded hole 20 in the hub of the crank 18 mounted at the left end of the crankshaft 16, as viewed in Fig. 3.

A suitable lifting handle 45 is fastened to the casing 34, by rivets 46, at the end of the toaster remote from the operating lever 22. The handle 45 may be used in cooperating with the operating lever 22 for lifting and moving the toaster when the outer casing 34 is hot.

The terminal connections may be protected against direct pulls on the supply conductor 31 by knotting the supply conductor within the casing 34 (not shown), or by other well-known strain relief means.

The inoperative position of the toaster of our invention serves an important function as a warming compartment, in which the toasted bread slices may be left unattended. When in this position, a portion of the toast protrudes above the top of the toaster and is easily accessible for removal. If the completed toast is not immediately required, it may be left in this position and kept warm for a considerable time by the heat retained in the casing after the current is turned off.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States, is:

1. An electric toaster comprising in combination, a base, vertically mounted end plates supported adjacent each end of said base, heating means disposed between said end plates to define a toasting space, a bread slice support vertically movable within said toasting space, a shaft extending between said end plates and supported for movement in slots located in said end plates, a rotatably mounted crank shaft, pivotally connected members linking said crank shaft to said first-named shaft, and means connecting said first-named shaft to said bread slice support whereby rotation of said crank shaft causes said first-named shaft to move in said slots and said movement is transmitted to said bread slice support.

2. An electric toaster comprising in combination, a base, vertically mounted end plates supported adjacent each end of said base, heating means disposed between said end plates so as to define a toasting space, a bread slice support vertically movable in said toasting space, a roller shaft extending horizontally between said end plates and supported for movement in vertical slots located in said end plates, a crankshaft rotatably mounted in openings provided in said end plates, pivotally connected members linking said crankshaft to said roller shaft and means connecting said roller shaft to said bread slice support, an operating handle connected to one end of said crankshaft, whereby movement of said handle rotates said crankshaft, moving said roller shaft vertically in said end plate slots, and said vertical movement is transmitted directly to said bread slice supports.

3. An electric toaster comprising in combination, a base, vertically mounted end plates supported adjacent each end of said base, a plurality of spaced-apart heating elements disposed between said end plates, a bread slice support vertically movable between said heating elements, a roller shaft extending horizontally between said end plates and supported for movement in vertical slots located in said end plates, a crankshaft rotatably mounted in openings provided in said end plates, pivotally connected members linking said crankshaft to said roller shaft and means connecting said roller shaft to said bread slice supports, an operating handle connected to one end of said crank shaft and a cam actuated switch connected to the opposite end of said crankshaft, whereby movement of said handle rotates said crankshaft, operating said cam-actuated switch to open or close an electric supply circuit for said toaster and moving said bread slice support vertically between said heating elements.

4. An electric toaster comprising in combination, a base, vertically mounted end plates supported adjacent each end of said base, a plurality of spaced-apart heating elements disposed between said end plates, a bread slice support vertically movable between said heating elements, a roller shaft extending horizontally between said end plates and supported for movement in vertical slots located in said end plates, a crank shaft rotatably mounted in openings provided in said end plates, pivotally connected members linking said crank shaft to said roller shaft and means connecting said roller shaft to said bread slice support, an operating handle connected to one end of said crank shaft and a cam actuated switch connected to the opposite end of said crankshaft, whereby movement of said handle rotates said crankshaft, so that when said operating handle is in a first position, said cam-actuated switch is closed and said bread slice support is located in an operating position between said heating elements, and when said operating handle is moved to a second position, said cam actuated switch is opened and said bread slice support is raised to an inoperative position.

5. An electric toaster comprising in combination, a base, vertically mounted end plates supported adjacent each end of said base, a plurality of spaced-apart heating elements disposed between said end plates, a bread slice support vertically movable between said heating elements, a roller shaft extending horizontally between said end plates and supported for movement in vertical slots located in said end plates, a crankshaft rotatably mounted in openings provided in said end plates, pivotally connected members linking said crankshaft to said roller shaft and means connecting said roller shaft to said bread slice supports, an operating handle connected to one end of said crankshaft and a cam-actuated switch connected to the opposite end of said crankshaft, whereby movement of said handle rotates said crankshaft, operating said cam-actuated switch to open or close an electric supply circuit for said toaster and moving said bread slice support vertically between said heating elements, said cam-actuated switch being provided with means for normally holding said bread slice support in an inoperative position, and said support being movable to an operative position only by manual operation of said handle.

6. An electric toaster comprising in combination, a base, vertically mounted end plates supported on said base, a plurality of spaced-apart heating elements disposed between said end plates, a horizontal bread slice support mounted for vertical movement between said heating elements, a horizontal roller shaft mounted for vertical movement in centrally located slots in said end plates, hanger members connecting said roller shaft and said bread slice support whereby movement of said shaft in said vertical end plate slots is transmitted directly to said bread slice support, a crankshaft extending longitudinally of said toaster parallel to said roller shaft and rotatably mounted in said end plates, crank members transversely mounted on the ends of said crankshaft, pivotally connected linkage members connecting the free ends of said cranks to the adjacent ends of said roller shaft, an operating handle connected to one end of said crankshaft and a switch cam connected to the opposite end of said crankshaft, whereby movement of said operating handle rotates said crankshaft and said switch cam to actuate an electric supply controlling switch for said toaster, and said operating handle movement is transferred through said crankshaft, said cranks, said linkage members, said roller shaft, and said hanger members to move said bread slice support vertically between said heating elements.

HUGH J. MIDDLETON.
JOHN A. HASHEK.